G. A. SAFSTROM.
TIRE TOOL.
APPLICATION FILED MAR. 25, 1918.
1,290,787.
Patented Jan. 7, 1919.
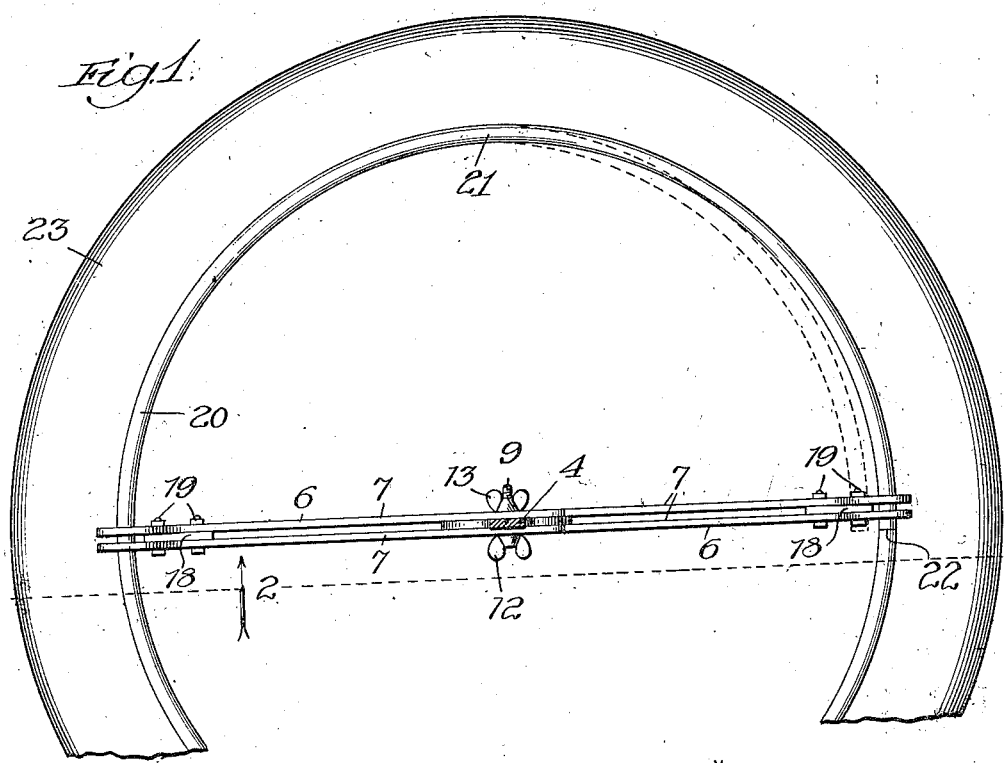
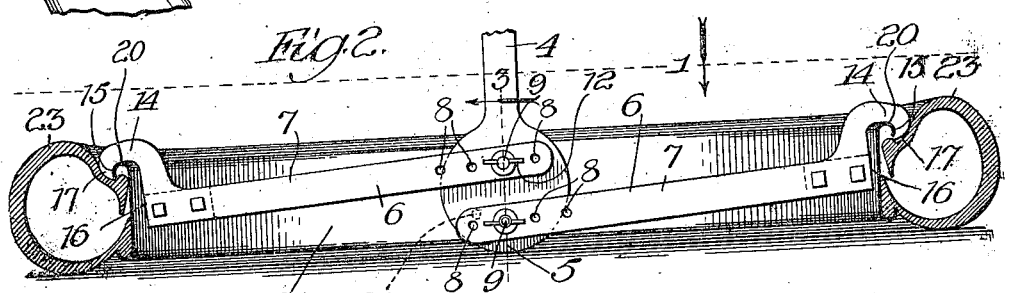
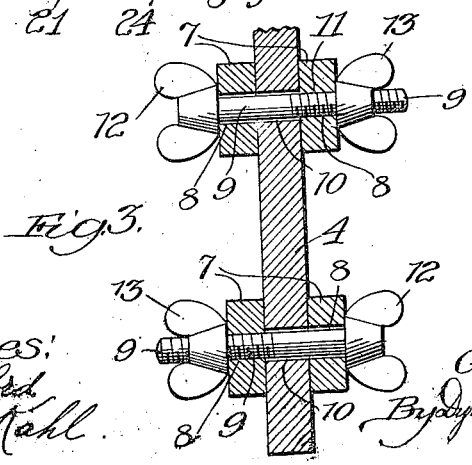
Inventor:
Gustaf A. Safstrom,

UNITED STATES PATENT OFFICE.

GUSTAF A. SAFSTROM, OF CHICAGO, ILLINOIS.

TIRE-TOOL.

1,290,787. Specification of Letters Patent. Patented Jan. 7, 1919.

Application filed March 25, 1918. Serial No. 224,517.

*To all whom it may concern:*

Be it known that I, GUSTAF A. SAFSTROM, a subject of the King of Sweden, and who has taken out his first papers for citizenship in the United States, residing at Chicago, in the county of Cook and State of Illinois, have invented a new and useful Improvement in Tire-Tools, of which the following is a specification.

My invention relates to tire tools for use in connection with demountable rims of wheels of vehicles, more particularly automobiles, and in accordance with the preferred embodiment of my invention, relates to a tool for contracting and expanding the demountable rim relative to the tire for facilitating the removal from the rim, and the application thereto, of tires.

As a preface to the following, it may be stated that the demountable rims referred to are severed crosswise, either straight across or at an angle to permit of the contraction and expansion above referred to, and in contracting them, one of the free ends of the rim is drawn inwardly relative to the other free end to permit it to pass the latter and move lengthwise thereof to reduce its diameter.

My primary objects are to provide a novel, simple, and positively operating tool for manipulating the demountable rim and preferably operate to both contract and expand it; and generally to so improve upon tire tools for use in connection with demountable rims, that they will be better adapted to perform their work.

Referring to the accompanying drawing, Figure 1 is a face view of a demountable rim with a tire thereon, the rim and tire being shown as partly broken away, with a tire tool constructed in accordance with my invention applied thereto and in position to be operated to contract the rim. Fig. 2 is a section taken at the line 2 on Fig. 1 and viewed in the direction of the arrow, this view showing the rim and tire in section and my improved tire tool in side elevation, a portion of the hand-operated lever forming a part of the device, being broken away; and Fig. 3, an enlarged broken section taken at the line 3 on Fig. 2 and viewed in the direction of the arrow.

According to the preferred illustrated embodiment of my invention, my improved tire tool which is adapted for both contracting and expanding a demountable rim, comprises a lever 4 having a rounded extremity as represented at 5; and rim-engaging elements 6 which extend in opposite directions from the lever 4 and are pivotally connected therewith at different points on the lever whereby when the lever is rocked in one direction, it will shift the members 6 longitudinally in a direction toward each other, and when the lever is rocked in the opposite direction, will force the members 6 longitudinally in the opposite direction to move them away from each other. The members 6 which are of the same construction are each formed of a pair of bars 7 containing at one end, bolt-holes 8, these bars extending at their apertured ends at opposite sides of the lever 4, as represented in the drawings. The means for pivotally connecting these bars to the lever 4 and represented at 9, extend through the openings 8 and openings 10 in the lever 4. While any desirable pivoting means may be employed, I prefer to provide those shown in the drawing, which involves the screw threading of the holes 8 in one of the bars 7 of each pair, as represented at 11, into which threaded part the bolt 9, which has a wing-nut section 12, screws, the threaded outer end of the bolt 9 having a stop-nut 13 screwed thereon. The outer ends of the bars 7 are provided with the hook-portions 14, which present the hook-shaped surfaces 15 at the extremities of the bars 7 and the outwardly-facing surfaces 16 between the surfaces 15 and the pivots 9. The outer extremities of the bars 7 are rounded as represented at 17 for a purpose hereinafter explained, and to hold the bars 7 in spaced relation, a plate 18 is interposed therebetween and secured to these bars as through the medium of the bolts 19. It will thus be understood that the members 6 are each provided at their outer ends with what may be termed a double rim-engaging claw formed of hook-portions spaced apart to grip the rim at different points, thus preventing the slipping of the tool from the rim and the rim from the tool.

In the use of the tool, the demountable rim with the tire thereon, and which is to be removed, in deflated condition, is laid flatwise on a support, as for example a floor, and my improved tire tool then applied to the rim to the position as shown in Fig. 2 namely, to cause the tool to extend transversely across the rim structure and engage beads 20 of the rim 21 at diametrically-opposed points, the tool at one side of the rim engaging one end of the rim adjacent the crosswise-extending rim joint 22, as represented in Fig. 1. The hook-portions 15 are pressed downwardly to interlock with the rim flanges, as stated, and in this position of the tool, the lever 4 extends substantially vertically. The operator then swings the lever 4 to the right in Fig. 2 with the result of shifting the members 6 longitudinally of each other in opposite directions to draw the hook-portions 15 toward each other, with the result of springing the free end of the rim engaged by the tool at the righthand side of Fig. 1, inwardly, this action operating to cause the free ends of the rim to shift longitudinally of each other, to contract the rim, whereupon the tire represented at 23 may be readily disengaged from the rim. It is desirable that the rim be held in contracted condition until the application of another tire to the rim, has been made and I thus provide for the locking of the members 6 in the retracted position to which they were moved in the operation of contracting the rim, these means comprising a pin, not shown, which may be inserted into a hole 24 in the lever 4 and interlock with the bars 7 shown uppermost in Fig. 2, it being understood that this opening 24 upon operating the lever as described, will extend substantially flush with the upper surfaces of these bars.

In the application of a tire to a rim contracted as stated, the tire is preliminarily applied to the rim in accordance with common practice and the locking pin referred to is then removed, and the handle 4 swung to the left in Fig. 2 to engage the portions 16 of the members 6 with the inner surfaces of the portions of the rim hereinbefore referred to, and force the rim into expanded condition in which its abutting free edges are caused to assume the abutting relation, as shown in Fig. 1, my improved tire tool, as I prefer to construct it, being thus adapted not only to the contracting of the rim to permit of the removal of the tire therefrom, but also to the expanding of the rim in the assembling of a tire therewith.

In the use of the tool, the lever 4, by preference, is caused to bear at its curved surface 5 against the floor or other support on which the tire with rim, is laid, as hereinbefore stated, the lever rolling at this surface upon the floor in the actuation of the lever to contract and expand the rim and thus permitting of the application to the tool of a large degree of force without the tool sagging.

The provision of the curved surfaces 17 is desirable inasmuch as danger of injury to the tire, especially in the rim-expanding operation, is reduced to the minimum; and the provision of the plurality of openings 8 along the bars 7, permits of the tool being adapted for use in connection with rims of different diameters, it being desired, as hereinbefore stated, that the lever 4 when the tire tool is applied to the rim and before it is actuated, extends substantially vertically, as shown in the drawing, so that in contracting and expanding the rim, the lever is moved from one side to the other of the perpendicular.

The provision of the pairs of bars 7 located at opposite sides of the lever 4 is of advantage as it equalizes the stress on these parts, avoiding side-strain.

Under some conditions, it is desirable that the tool engage the rim at opposite edges thereof as distinguished from engaging it at the same edges as shown in Fig. 2, and such operation is made possible by my construction inasmuch as either one of the members 6 may be disconnected from the lever 4 and re-applied thereto in inverted condition.

While I have illustrated and described a particular construction embodying my invention, I do not wish to be understood as intending to limit it thereto, as the same may be variously modified and altered without departing from the spirit of the claims.

What I claim as new and desire to secure by Letters Patent is—

1. A tire-tool comprising a lever having a rounded extremity at which it is adapted to rock upon the support for the rim and on a level with the plane of the rim, and elements connected with said lever at different points to cause said elements to be shifted longitudinally relative to each other upon actuating said lever, said elements having projections at their ends adapted to interlock with a rim to be contracted.

2. A tire-tool comprising pairs of spaced apart bars extending in opposite directions, and means for shifting said bars longitudinally of each other, each pair of said pairs thereof having a projection for interlocking with a rim in spaced apart positions thereon.

3. A tire-tool comprising bars extending in opposite directions, and means for shifting said bars longitudinally relative to each other in both directions, said bars containing recesses in their ends presenting surfaces for hooking on the flange of the rim for contracting the same, and surfaces for abutting the rim to expand the same, and intermediate surfaces to rest on and support the bars on the rim in position for engagement of either of the first named surfaces, said intermediate surfaces being elongated so that when the tool is properly expanded and is put down on the rim the parts beyond the recesses may force the tire away from the rim flange until said elongated surfaces rest upon the rim, when contraction of the device will cause the hooking surfaces to engage said flange.

4. A tire-tool comprising bars extending in opposite directions, and means for shifting said bars relative to each other in both directions, said bars having off-set portions with hooked ends whereby a relatively long shoulder surface is provided at the off-set for expanding the rim and the body of the bar is brought to about the mid plane of the rim when the off-set parts rest on the rim to support the device, while the hooked ends are opposed to the flange of the rim to interlock therewith for contracting the rim, and the rim may be either contracted or expanded without a reapplication of the device thereto.

5. A tire-tool comprising a lever having a rounded extremity at which it is adapted to rock on the support for the rim and on a level with the plane of the rim, and elements connected with said lever at different points to cause said elements to be shifted longitudinally relative to each other upon actuating said lever, said elements having projections at their ends adapted to interlock with a rim to be contracted, and means for locking said elements in their rim contracting position.

GUSTAF A. SAFSTROM.